(12) United States Patent
Lundqvist

(10) Patent No.: US 6,502,397 B1
(45) Date of Patent: Jan. 7, 2003

(54) DEVICE FOR THE TRANSFER OF EXHAUST GAS FROM THE EXHAUST COLLECTOR OF A SUPERCHARGED INTERNAL COMBUSTION ENGINE TO THE INLET CONDUIT THEREOF

(75) Inventor: Ulf Lundqvist, Stockholm (SE)

(73) Assignee: Motortestcenter MTC AB, Haninge (SE)

(*) Notice: Subject to any disclaimer, the term of this patent is extended or adjusted under 35 U.S.C. 154(b) by 0 days.

(21) Appl. No.: 10/049,842
(22) PCT Filed: Feb. 29, 2000
(86) PCT No.: PCT/SE00/00390
§ 371 (c)(1),
(2), (4) Date: Feb. 19, 2002
(87) PCT Pub. No.: WO01/14706
PCT Pub. Date: Mar. 1, 2001

(30) Foreign Application Priority Data

Aug. 23, 1999 (SE) ................................. 9902966

(51) Int. Cl.$^7$ ................................. F02B 33/44
(52) U.S. Cl. ................................. 60/605.2; 60/605.1
(58) Field of Search ................................. 60/605.1, 605.2, 60/597

(56) References Cited

U.S. PATENT DOCUMENTS

| 4,323,045 | A |   | 4/1982 | Yamashita |           |
|-----------|---|---|--------|-----------|-----------|
| 4,503,833 | A | * | 3/1985 | Yunick    | 125/545   |
| 5,333,456 | A |   | 8/1994 | Bollinger |           |
| 5,611,203 |   | * | 3/1997 | Henderson et al. | 60/605.2 |
| 5,617,726 |   | * | 4/1997 | Sheridan et al.  | 60/605.2 |
| 6,216,458 |   | * | 4/2001 | Alger et al.     | 60/605.2 |

FOREIGN PATENT DOCUMENTS

| WO | WO 96/30635 | 10/1996 |
| WO | WO 96/32583 | 10/1996 |

* cited by examiner

Primary Examiner—Hoang Nguyen
(74) Attorney, Agent, or Firm—Young & Thompson

(57) ABSTRACT

A device for transferring EGR gasses from the exhaust collector of a supercharged internal combustion engine to its inlet conduit includes, besides a supercharge unit, a venturi device having the purpose of sucking the EGR gasses from the exhaust collector into the inlet conduit in order to overcome the high gas pressure in the pressurized charging air in this conduit. In order to adjust the amount of sucked-in EGR gas to the different load points, under which the engine works, an injector tube is arranged in the inlet section to the canal of the venturi device, through which injector tube the EGR gasses are led into the inlet conduit. The free end of this injector tube delimits, together with the surrounding canal wall, a ring-shaped passage, whose cross-sectional area may be varied by an axial relative motion between the injector tube and the venturi device.

7 Claims, 3 Drawing Sheets

Figure 1:
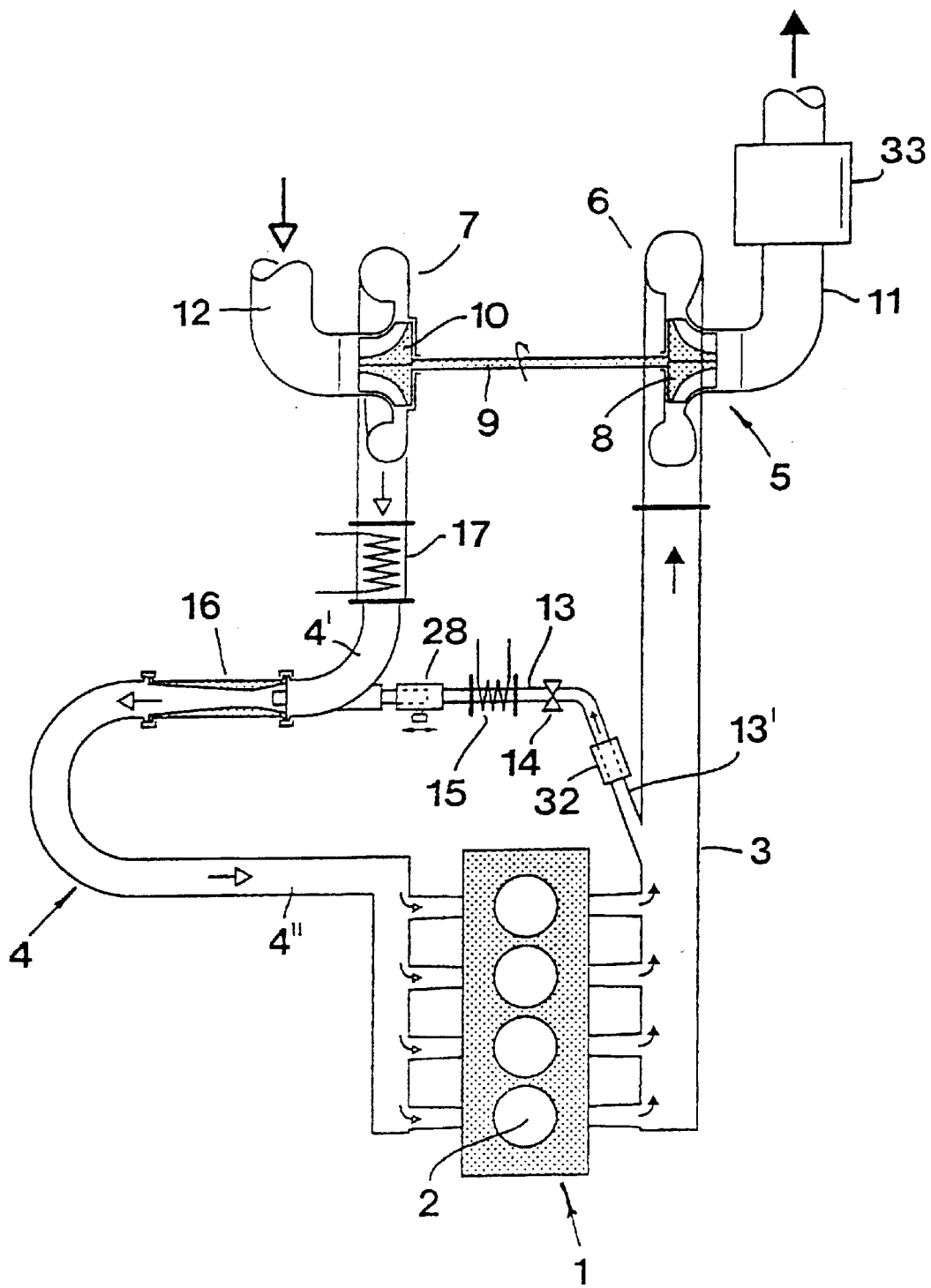

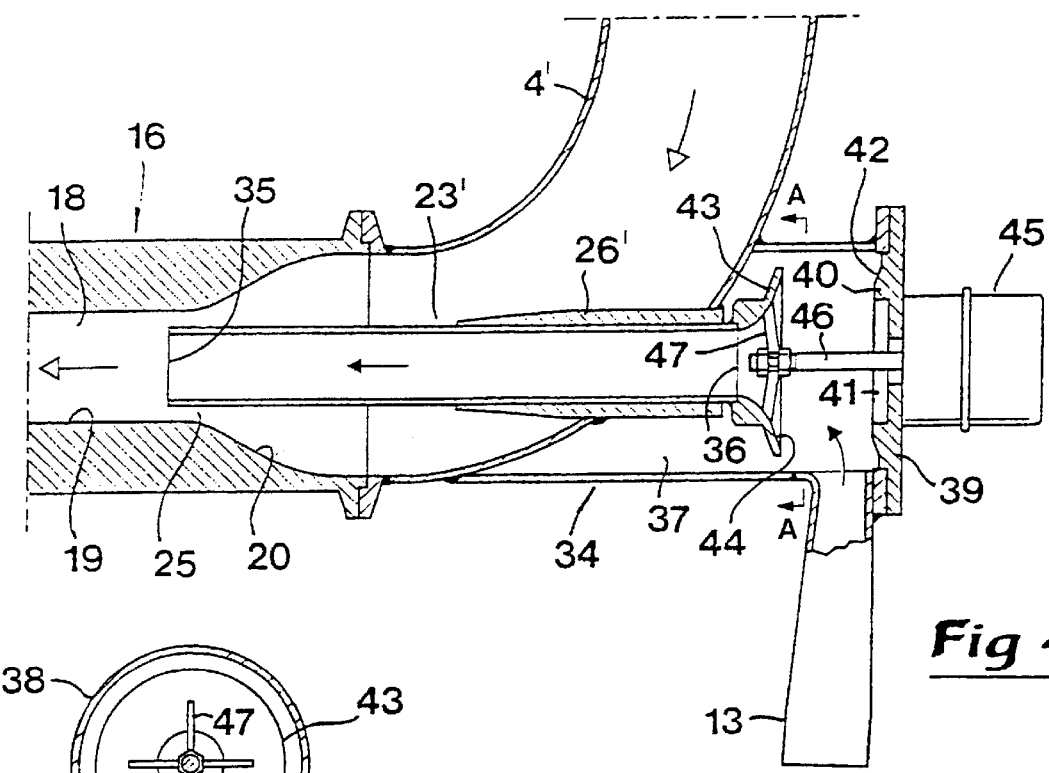
*Fig 4*
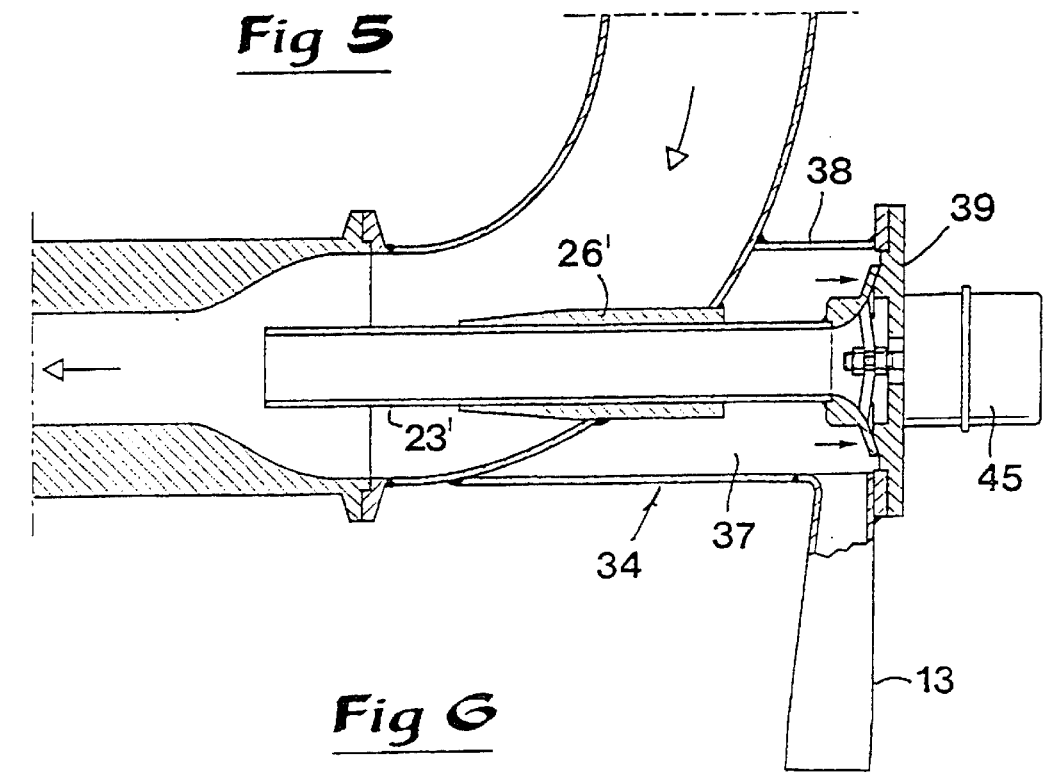
*Fig 5*
*Fig 6*

DEVICE FOR THE TRANSFER OF EXHAUST GAS FROM THE EXHAUST COLLECTOR OF A SUPERCHARGED INTERNAL COMBUSTION ENGINE TO THE INLET CONDUIT THEREOF

TECHNICAL FIELD OF THE INVENTION

This invention relates to a device for the transfer of exhaust gas from the exhaust collector of a supercharged internal combustion engine to the inlet conduit thereof, comprising a supercharge unit with a turbine connected to the exhaust collector, the wheel of which turbine being rotatable by means of flowing exhaust gasses from the exhaust collector and drivingly connected with an impeller of a compressor provided in the inlet conduit, which compressor is connected to on one hand an external inlet conduit part for sucking in air from outside by means of the impeller, and on the other hand to said inlet conduit for feeding of pressurized charging air to the engine, and a transfer conduit extending between the exhaust collector and the inlet conduit for, when necessary, transferring exhaust gasses from the exhaust collector to the inlet conduit in and for mixing with the charging air before the latter is fed to the engine, a venturi device being provided in the inlet conduit, of the type that comprises a canal that is delimited by on one hand a waist-like section with a smallest cross-sectional area, and on the other hand two sections with a tapering shape, viz. a converging inlet section located upstream of the waist section and a diverging outlet section functioning as a diffusor located downstream of the same, and the transfer conduit ending in or upstream of the waist section in the canal, so that exhaust gasses from the exhaust collector be sucked into the pressurized charging air in the inlet conduit, viz. by the venturi effect.

PRIOR ART

The recirculation of exhaust gas or the so called EGR (=Exhaust Gas Recirculation), is applied in order to reduce the concentration of nitrogen oxides ($No_x$) in exhaust gasses from internal combustion engines, such as Diesel engines. Here, the returned exhaust gasses or EGR gasses function in a way that the combustion temperature in the cylinders of the engine is lowered, whereby the amount of nitrogen in the inlet air that may be transformed into nitrogen oxides, is reduced. At turbo-supercharged Diesel engines, which are the most common type of heavy Diesel engines, the EGR systems may be divided into two main categories, viz. so called long way systems and short way systems, respectively. In the long way systems, the necessary amount of EGR gasses is taken out downstream of the turbo unit turbine and is introduced upstream of the unit compressor. In the short way systems, the EGR gasses are taken out upstream of the turbine, viz. via a transfer conduit that is connected to the inlet side of the engine at a point located somewhere downstream of the compressor. In the transfer conduit is a control valve for the purpose of regulating the amount of drawn-off EGR gas, normally in dependence on parameters that represent the operation state of the engine. One problem for specifically short way systems is that if the turbo supercharge is made effective, the pressure of the charging air in the inlet conduit will become higher than the gas pressure in the exhaust H collector. This involves that some form of pressure-increasing or sucking means has to be used in order to force the EGR gasses into the inlet conduit. A previously applied method of sucking the EGR gasses into the inlet conduit is to provide a venturi device of the type as defined in the preamble. In the narrow, waist-like section in a venturi canal, the velocity of a passing gas becomes high, at the same time as the statical gas pressure becomes low, which involves that the EGR gasses may be sucked in from the exhaust collector via the transfer conduit. The outlet section situated downstream of the waist section diverges in the downstream direction and serves as a diffusor, which slows down the gas and increases the pressure in it. In this way, the charging air recovers a certain part of its original pressure after having been mixed with EGR gasses and passed the waist section.

Another way of forcing the EGR gasses into the charging air is to simply pump in the EGR gasses by means of a pump.

A particular problem in connection with the use of a venturi device for sucking in the EGR gasses is that the charging air flow and the pressure conditions between the exhaust collector and the inlet conduit vary in dependence of the different load points of the internal combustion engine. One way of solving specifically this problem is to construct the venturi canal with a narrowest waist section that is sufficiently small to be capable of sucking the required amount of EGR gasses in all load points. In order to restrict the amount of EGR gas in all other load points, a certain amount of charging air is led past or outside the venturi device via a special bypass conduit (cf., e.g., WO 96/32583). However, a disadvantage with such a bypass of the charging air is that the pressure recovering-is not achieved and that the venturi device gets a bad efficiency.

Another solution of the problem with varying load conditions is to make the venturi device with an elastically deformable canal wall in the region of the narrow waist section, at same time as the EGR gasses are led into the center of the venturi canal, more specifically via a fixedly arranged injector tube. This problem solution has been published under the denomination VARIVENT and is based on the use of rubber or another elastic material in the canal wall in connection with the waist section of the canal, whose cross-sectional area may be varied by applying varying external forces upon the elastic canal wall, e.g., by means of compressed air. However, in practice, a construction of this type becomes complicated and costly, and the rubber material has a limited life in the tough environment in which the canal wall steadily works, due to alternating contractions and expansions.

OBJECTS AND CHARACTERISTICS OF THE INVENTION

The present invention aims at removing the above-mentioned inconveniences of previously known devices for EGR gas transfer and creating an improved transfer device. A primary object of the invention is to create a transfer device with a venturi device that is constructively simple and has a long-term resistance against the gas environment in which the device works. Another object is to provide a device that functions in a reliable way and that makes possible a fine control of the amounts of EGR gasses in the charging air supplied to the engine, also at quickly changing load conditions for the engine. It is also an object to create a gas transfer device in which the venturi device per se is compact and requires a small space for its accomodation.

In accordance with the invention, at least the primary object is achieved by means of the features that are defined in the characterizing clause of claim 1. Furthermore, advantageous embodiments of the invention are defined in the dependent claims.

Further Elucidation of the Prior Art

In U.S. Pat. No. 5,333,456 an exhaust gas transfer device is disclosed with a venturi device in the inlet conduit for charging air between a compressor of a supercharge unit and the engine, the supply of EGR gasses to said conduit being controlled by means of an axially movable control means. However, in this case the control means has the shape of a valve cone applied on a bar, arranged in a constriction in the transfer conduit for the EGR gasses, these EGR gasses being introduced radially into the main inlet conduit for the charging air, more specifically at a point situated downstream of the waist section of the venturi device, i.e., in the diffusor part of the venturi device.

BRIEF DESCRIPTION OF THE APPENDED DRAWINGS

Figure 2:
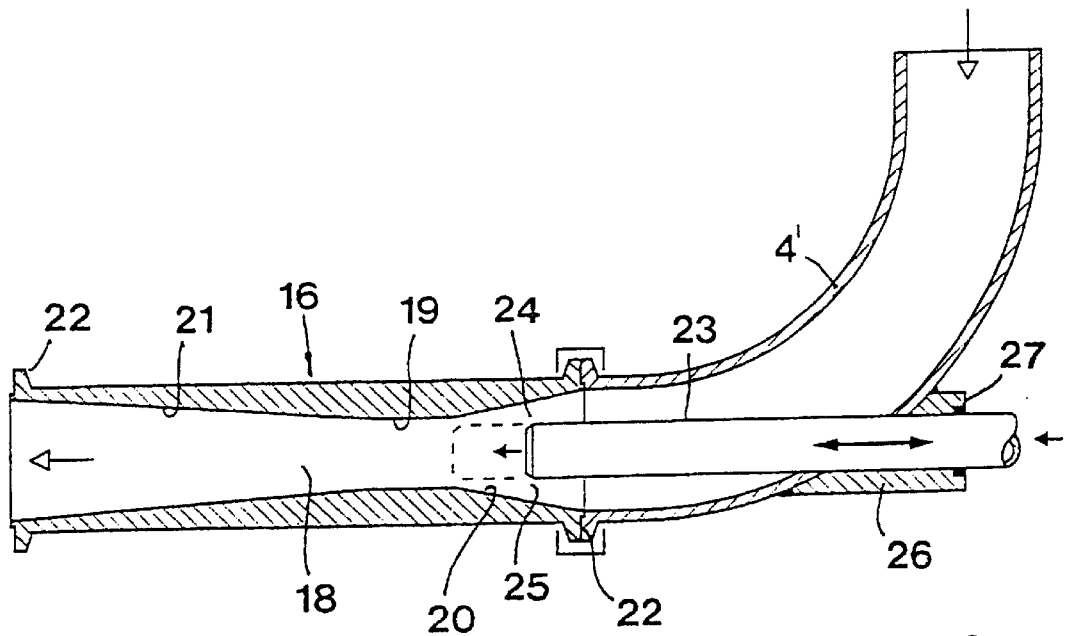
Figure 3:
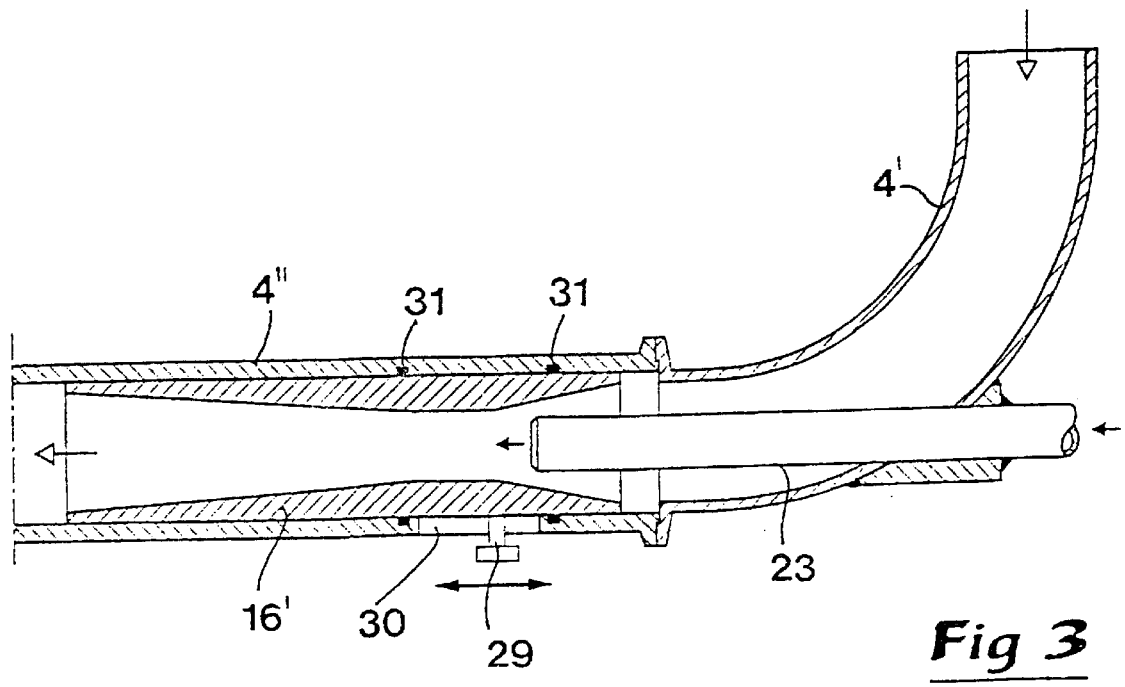

In the drawings:

FIG. 1 is a schematic combination view of a device according to the invention shown in connection with an internal combustion engine, FIG. 2 is an enlarged longitudinal section of a first embodiment of a transfer device according to the invention, FIG. 3 is a similar longitudinal section showing a second, alternative embodiment of the device according to the invention, FIG. 4 is a longitudinal section illustrating a third, further developped embodiment of the invention, FIG. 5 is a cross-section A—A in FIG. 4, and FIG. 6 is a longitudinal section corresponding to FIG. 4, showing the same device in another functional state.

DETAILED DESCRIPTION OF PREFERRED EMBODIMENTS OF THE INVENTION

In FIG. 1, reference numeral 1 designates generally an internal combustion engine of the piston engine type, that comprises a plurality of cylinders 2. In practice, this motor may consist of, e.g., a four-stroke Diesel engine intended for heavier vehicles such as trucks, busses or similar. At an outlet end, the engine 1 has an exhaust collector 3 that may have a most varied shaping, but comprises a number of branch conduits or canals connected to a manifold for evacuating the exhaust gasses from the engine. At the inlet side of the engine is an inlet conduit designated 4 in its entirety, for the supply of charging air or gas via branch canals to the different cylinders of the engine.

For feedback of exhaust gasses or EGR gasses from the exhaust collector 3 to the inlet side of the engine is provided a turbo unit designated 5 in its entirety, which unit in the usual way comprises on one hand a turbine 6 and on the other hand a compressor 7. A turbine wheel 8 actuating in the turbine is co-rotatively connected with an impeller 10 in the compressor 7 via an axis 9. From the exhaust collector 3 flow the exhaust gasses from the engine out through an exhaust pipe 11 (with a not shown silencer), the exhaust gasses setting the turbine wheel 8 in rotation during their passage through the turbine 6. This rotating motion is transferred via the axis 9 to the impeller 10, which from the outside sucks in and compresses fresh, preferably filtered supply air via an external inlet conduit part 12.

Between the exhaust collector 3 and the inlet side of the engine, extends a transfer conduit 13, by means of which a certain amount of EGR gasses, when so required, may be transferred from the exhaust collector to the inlet side of the engine. In this conduit 13 are on one hand a stop valve 14, by means of which the conduit may be shut off or held open, and on the other hand a cooler 15 for cooling the gas taken from the exhaust collector. In practice, the valve 14 cooperates with sensors and control means that determine the functional state of the valve in dependence of parameters that represent the actual operation conditions or load point of the engine.

The gas transfer conduit 13 is connected to a venturi device contained in the inlet conduit 4, said venturi device being generally designated 16. The part of the inlet conduit 4 that is located upstream of the venturi device 16 is designated 4', while the part of the conduit located downstream of the venturi device is designated 4". In the conduit part 4' is provided a second cooler 17 for cooling the introduced charging air that is compressed by the compressor 7 and then is heated and simultaneously brought to a comparatively high pressure. The general purpose of the venturi device 16 is to suck in EGR gasses from the exhaust collector into the charging air passing in the inlet conduit 4, while overcoming the higher gas pressure in the inlet conduit.

In this context it should be pointed out that engines equipped with gas transfer devices of the present type are sometimes named EGR engines.

As may be seen in FIG. 1 in combination with FIG. 2, the venturi device 16 consists of a piece of tube with a central canal 18 that is delimited by three different surfaces or walls, viz. a comparatively narrow waist section 19, a tapering inlet section 20 that converges in the direction of the gas flow, and an equally tapering, although in the downstream direction diverging, outlet section 21. In practice, the waist section 19, that has a smallest cross-sectional area, usually has the shape of a cylindrical surface with a certain longitudinal extension, although in theory it is also feasible to confer to this section another cross-sectional shape than just circular, e.g., oval. The diverging shape of the outlet section 21 may advantageously be constituted by a genuinely conical surface, although also other shapes are feasible. In order to make the outlet section capable of serving as a diffusor for the passing gas, the cone angle of this surface should not exceed the magnitude of 3,5 to 5° (double cone angle=7 to 10°). Also the inlet section 20 may consist of an at least partly conical surface. At the upstream end, this section may also transpose into a trumpet shape (not shown).

According to the embodiment in FIG. 2, the piece of tube 16 constitutes an integrated part of the inlet conduit 4, more specifically by being connected at opposed ends with the conduit parts 4' and 4", respectively, e.g., by flange joints 22. In this context, it should be pointed out that the piece of tube 16 as well as other tube parts included in the inlet conduit 4 are advantageously made of metal or any other stiff, resistant material.

The device shown in FIGS. 1 and 2 and described so far is substantially previously known.

The new and characteristic for the present invention is that in the inlet section 20 of the venturi canal 18 is provided a special control means in the form of an injector tube 23 having a free front end 24, which together with the surrounding wall or surface 20 that defines the inlet section of the canal 18, delimits a ring-shaped passage 25 through which charging air from the compressor passes. In accordance with the basic inventive concept, the injector tube 23 and the venturi device are axially movable relative to each other in order to readjust or vary the cross-sectional area of the ring-shaped passage 25, when so required.

The rear end of the injector tube 23 is connected to or is included in the transfer conduit 13. According to the example in FIG. 2, the tube 23 is displaceably mounted in bearings in a sleeve-like holder 26 that is fixedly placed outside the conduit part 4', which in this region has the shape of an elbow pipe. The holder 26 may include one or several sealings 27 that guarantee gas tightness in the boundary surface between the injector tube and the holder. At its rear end, the injection tube 23 is connected to an adjustment device 28 (see FIG. 1), by means of which the injection tube may be moved axially reciprocally. In practice, this adjustment device 28 may be realized in different ways, e.g. in the form of a linear motor, a rack mechanism or a screw mechanism. The rear end of the injector tube may, as hinted in FIG. 1, be inserted into and sealed relative to a grip comprised in the holder 26, to which grip the conduit tube 13 per se is connected. It is also feasible to connect the injector tube 23 to the conduit tube 13 via an intermediate, flexible piece of hose that is capable of absorbing the axial movements of the injector tube.

In particular, it should be pointed out that the injector tube 23 and the piece of tube 16 are concentrical. In other words, the injector tube 23 is centrically placed in the venturi canal 18.

In practice, the dimensions of the venturi canal 18 as well as of the gas controlling injector tube 23 may vary within fairly wide limits. However, as concrete examples of feasible dimensions may be mentioned: The venturi tube 16 may have an outer diameter of 60 mm and an inner diameter which in the narrow waist section 19 may amount to 30 mm. Here, the connecting tube parts 4', 4" may have an outer diameter of 60 mm and an inner diameter of 50 mm. This involves that the converging inlet section 20 has a largest diameter of 50 mm. Here, the length of the inlet section 20 may lie within the range 50 to 60 mm. Under such conditions, the injector tube 23 may have an outer diameter of about 20 to 22 mm and a length of stroke of about 30 mm. In FIG. 2 is shown the injector tube 23 with continuous lines in a rear end position, while the front end position of the tube is indicated with dashed lines. Thereby, it may be seen that the front end 24 of the injector tube 23 in the front, pushed-in end position is located about the transposition region between the conical inlet section 20 and the cylinder-shaped waist section 19. In this position, the ring-shaped passage 25 has a minimal cross-sectional area. In the rear end position, the front end of the injector tube is located about half-way between the two opposed ends of the inlet section 20. In this state, the ring passage 25 has a maximal cross-sectional area.

When the adjustable injector tube 23 is introduced into its front end position, then the ring-shaped passage 25 has a cross-sectional area that is sufficiently small for EGR gasses from the exhaust collector to be driven or sucked into the inlet conduit in such load points when the charging air flow to the engine is low and the gas pressure upstream the venturi device is high in comparison with the gas pressure in the exhaust collector. Thereafter, when the injector tube is pulled out to the outer end position—or to some intermediate adjustment position—the cross-sectional area of the ring passage 25 is increased in order to drive EGR gasses from the exhaust collector to the inlet side of the engine at a higher charging air flow and a lower pressure difference between the exhaust collector and the inlet collector, without therefore creating any larger pressure drop over the venturi device.

In FIG. 2 may be seen how the front end 24 of the injector tube 23 advantageously may have a bevelled, e.g., conical shape, in order to counteract turbulence phenomena when the incoming charging air passes the tube end.

From the above description it may be seen that the embodiment according to FIG. 2 utilizes a fixed venturi tube and a movable controlling means in the form of the injector tube 23, in order to realize the axial relative motion between the venturi device and the controlling means. In FIG. 3 is shown an alternative embodiment, in which the injector tube 23 is fixedly arranged and a venturi device 16' is movably arranged. In that case, the venturi device consists of a piece of tube that is provided within an external conduit tube, e.g. the conduit part 4", and movably reciprocally relative to it. In FIG. 3 is schematically shown how the piece of tube 16' comprises a carrier 29 that extends through a long and narrow slot 30 in the piece of tube 4". By means of a suitable mechanism, e.g., a screw mechanism, the carrier 29 may bring the piece of tube forwards and backwards. On both sides of the slot 30 are sealings 31 for avoiding any leakage of gas through the slot.

According to a preferred embodiment of the invention, a schematically shown gas pulse conversion device 32 is provided in the transfer conduit 13, said device 32 (cf. FIG. 1) having the purpose of maximizing the statical gas pressure in this conduit. In practice, this device may, in a way known per se, comprise a funnel-shaped construction that facilitates the gas flow in the direction from the exhaust collector to the venturi device, but counteracts a flow in the opposite direction. In this context it should also be pointed out that the portion 13' of the transfer conduit 13 that is connected to the exhaust manifold 3 advantageously may extend at a limited, acute angle to the tube 3. For instance, the acute angle between the tube 3 and the conduit portion 13' may lie within the region 15 to 30°. In the example according to FIG. 1, it is indicated how the conduit portion 13' ends directly in the wall of the tube 3. However, it is also feasible to form the conduit portion 13' with a pitot tube introduced into the larger tube 3.

As may be seen in FIG. 1, the exhaust tube 11 located downstream of the turbine 6 may include a particle trap 33 having the purpose of separating solid particles from the exhaust gasses emitted via the exhaust tube.

Reference is now made to FIGS. 4 to 6, which illustrate an embodiment according to the invention that is further developped in comparison with the embodiment according to FIG. 2. In this case, outside the inlet conduit 4, more precisely its part 4' located upstream of the venturi device 16, is placed a housing 34, in which ends a rear end of an injector tube 23'. In this case, the injector tube 23' has the shape of a piece of tube of limited length that, besides a front outlet opening 35, comprises a rear inlet opening 36. The piece of tube 23' is axially movable in a sleeve 26' that is fixedly placed in a through hole in the conduit 4', a certain part of the sleeve protruding into the interior of the conduit 4', while the opposed end of the sleeve protrudes into the cavity 37 that is delimited by the housing 34. Here, the transfer conduit 13 is connected to an outer end of the housing 34, distal from the conduit 4', preferably via a flattened end portion of an otherwise cylindrical tube.

The shape of the housing 34 may vary within wide ranges. However, in the shown example the housing is composed of on one hand a cylindrical part 38 that protrudes in the extension of an imaginary central geometrical axis through the venturi device and the injector tube, and on the other hand of a substantially planar gable wall 39 oriented across the longitudinal extension of the cylinder part. On the inside of this gable wall 39 is provided a ring-shaped shoulder 40 that delimits a depression 41 in the gable wall and that has a peripheric conical surface 42.

In connection with the inlet opening 36 of the injector tube 23' is provided a funnel-like collar 43, whose peripheric portion has a conical surface 44 that may be borne against the cone surface 42 on the ring shoulder 40.

In order to effect a dislocation of the injector tube 23' between different axial positionings, the tube is connected with an adjusting device 45 located at the outside of the gable wall 39. More specifically, this adjusting device comprises an axially movable bar 46, which has a free end connected with the collar 43 of the injector tube 23 via a plurality of radial, spoke-like pins 47 which make possible a free passage of gasses through the injector tube.

In FIG. 4 is shown the injector tube in a front end position, in which the outlet opening 35 is maximally introduced into the venturi device and the ring-gap 25 has a minimal cross-sectional area. From this outer end position, the injector tube may be dislocated and adjusted to different axial adjustment positions of which one, namely a rear end position, is shown in FIG. 6. In this rear end position, the collar 43 is laid against the gable wall 39, in particular its ring-shaped shoulder 40, whereby the supply of EGR gasses to the injector tube and the venturi is shut off. As a consequence of the radial extension of the collar 43 outside the injector tube, the pressure from the EGR gasses in the transfer conduit 13 and the interior 37 of the housing will act rearwardly against the collar, as indicated by the arrows in FIG. 6. In other words, the pressure in the cavity 37 will bring about a sealing pressing of the conical contact surface 44 of the collar against the correspondingly conical contact surface 42 on the inside of the gable wall. This involves that the adjusting device per se need not act with a considerable force to keep the collar in the sealing rear end position. Of this reason, the special stop valve 14 as shown in FIG. 1, may be dispensed of in the embodiment according to FIGS. 4 to 6.

FUNCTION AND ADVANTAGES OF THE INVENTION

As initially pointed out, one problem with EGR systems of the short way type is that the pressure relation over the engine in a plurality of load point ranges is positive as far as the pressure in the inlet conduit is higher than in the exhaust collector. In the venturi device according to the invention is created a sucking effect by the fact that the charging air flow is accelerated in the converging inlet section 20 of the venturi device to a higher velocity, so that the static pressure in this section sinks below the average pressure of the transfer conduit 13, whereby a suction of EGR gasses into the charging air flow is made possible. Along a mixing section, the EGR gasses are mixed with the charging air while maintaining the common or total momentum for the charging air flow and the EGR gas flow. This involves that the charging air flow transfers a certain amount of its momentum to the EGR gasses. In the diffusor part of the venturi device, i.e. the outlet section 21, the gas flow is slowed down while increasing the static pressure in such a way that a relief does not occur. The fact that the pressure conditions and the air flow vary strongly in dependence of varying load points of the engine, complicates the dimensioning of the venturi device in general. However, by varying the axial adjustment of the injector tube in relation to the venturi device in the way that distinguishes the invention, an easily steered, robust and efficiently variable venturi device may be realized.

A basic advantage of the device according to the invention is that the suction capacity of the venturi device may be optimized at all charges, external control valves with their losses and complexity being eliminated. Furthermore, the fact that EGR gasses are led centrally into the charging air flow brings about an advantageous flow profile that is less sensitive to reliefs in the diffusor part. Moreover, the entire flow of the mixture of charging air and EGR gasses passes through the diffusor part of the venturi device, whereby the pressure restoration is achieved for the whole flow; something that in turn guarantees a high charging pressure, which is of decisive importance for a low emission formation by EGR engines. Further, the high efficiency of the variable venturi device at all operation conditions, makes possible large positive pressure drops between the inlet conduit and the exhaust collector. In turn, a large positive pressure drop results in low amounts of remaining gasses, besides a positive gas exchange work in the low pressure cycle; something that leads to a reduced fuel consumption. Moreover, low amounts of remaining gasses confers to the engine an improved EGR durability relative to particles, something that is directly decisive for the fuel consumption of a Diesel engine at a given $NO_x$ level. Particularly advantageous is the embodiment of the invention shown in FIGS. 4 to 6, in that it in a simple way makes possible a perfect shutting off of the EGR gas flow, more specifically with the very same adjusting device that is used for the control of the EGR gas flow. By shutting off or possibly restricting the EGR gas flow during transients, a good response by the supercharging unit in its entirety is achieved. It may also be noted that the construction of the variably venturi device permits a quick and exact control of the EGR gas flow, which is favourable in transients. When the EGR gas outlet of the exhaust collector is equipped with a gas pulse conversion device 32 of the type shown in FIG. 1, then it is achieved that the pulse energy to a large extent still may be utilized in the turbine part of the supercharge unit, at the same time as the pressure in the EGR gas transfer conduit increases.

FEASIBLE MODIFICATION OF THE INVENTION

The invention is not restricted solely to the embodiment examples as described above and shown in the drawings. Thus, it is feasible to use other tubes instead of a genuinely cylindrical injector tube, e.g., tubes which at their front end have an end portion that is bulb-shaped or widened in some other way.

What is claimed is:

1. A device for the transfer of exhaust gas from the exhaust collector (3) of a supercharged internal combustion engine to the inlet conduit (4) thereof, comprising a supercharge unit (5) with a turbine (6) connected to the exhaust collector, the wheel of which turbine being rotatable by means of flowing exhaust gasses from the exhaust collector and drivingly connected with an impeller of a compressor (7) provided in the inlet conduit (4), which compressor (7) is connected to on one hand an external inlet conduit (12) part for sucking in air from outside by means of the impeller, and on the other hand to said inlet conduit (4) for feeding of pressurized charging air to the engine (1), and a transfer conduit (13) extending between the exhaust collector (3) and the inlet conduit (4) for, when necessary, transferring exhaust gasses from the exhaust collector to the inlet conduit in and for mixing with the charging air before the latter is fed to the engine, a venturi device (16, 16') being provided in the inlet conduit (4), of the type that comprises a canal (18) that is delimited by on one hand a waist-like section (19) with a smallest cross-sectional area, and on the other hand two sections with a tapering shape, viz. a converging inlet section (20) located upstream of the waist section and a diverging outlet section (21) functioning as a diffusor located downstream of the same, and the transfer conduit (13) ending upstream of the waist section in the canal, so that exhaust gasses from the exhaust collector be sucked into the pressurized charging air in the inlet conduit (4) by the venturi effect, characterized in that an injector tube (23, 23') connected to the transfer conduit (13) is provided in the inlet section (20) of the canal (18), said injector tube having a free, open end which, together with the surrounding canal wall, delimits a ring-shaped passage (25) for the charging air, and in that the injector tube (23, 23') and the venturi device (16, 16') are axially movable relative to each other.

2. Device according to claim 1, characterized in that the venturi device (16) is fixedly arranged and the injector tube (23) axially movable relative to it.

3. Device according to claim 2, characterized in that the injector tube (23') is open at opposed ends and provided in a housing (34) separated from the inlet conduit (4'), in which housing the transfer conduit (13) ends, the injector tube being axially movable within the housing, more specifically between the front end position, and a rear, gas-stopping end position, in which an open, rear inlet opening (36) to the tube is directly or indirectly set against a wall (39) of the housing (34), and in which position the supply of EGR gas to the interior of the tube from the transfer conduit (13) is made impossible.

4. Device according to claim 3, characterized in that adjacent to the inlet opening (36) of the injector tube (23') is provided a funnel-like collar (43), which may be sealingly set by means of a peripherical portion against a ring-shaped shoulder (40) provided in said housing wall (39).

5. Device according to claim 4, characterized in that a contact surface (42) on the ring-shaped shoulder (40), said surface (42) being turned towards the collar (43), as well as a cooperating contact surface (44) on the collar (43), said surface (44) being turned towards the shoulder (40), have a slightly conical shape.

6. Device according to claim 1, characterized in that the venturi device consists of a piece of tube (16') that is arranged within an external tube part (4") comprised in said inlet conduit (4) and axially reciprocally movable relative to it.

7. Device according to claim 1, characterized in that in the transfer conduit (13) is provided a gas pulse conversion device (32) with the purpose of maximizing the statical gas pressure in the conduit.

* * * * *